(12) United States Patent
Castrejon, III et al.

(10) Patent No.: US 12,073,209 B2
(45) Date of Patent: Aug. 27, 2024

(54) SYSTEM FOR ENHANCED COMPONENT-LEVEL DETECTION IN SOFTWARE APPLICATIONS WITHIN A COMPUTING ENVIRONMENT

(71) Applicant: BANK OF AMERICA CORPORATION, Charlotte, NC (US)

(72) Inventors: Tomas M. Castrejon, III, Fort Mill, SC (US); Manu Jacob Kurian, Dallas, TX (US); David Nardoni, Sierra Madre, CA (US); Joel Townsend, Spring Church, PA (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 252 days.

(21) Appl. No.: 17/706,781

(22) Filed: Mar. 29, 2022

(65) Prior Publication Data
US 2023/0315439 A1   Oct. 5, 2023

(51) Int. Cl.
*G06F 8/70* (2018.01)
*G06F 21/57* (2013.01)
*G06N 5/022* (2023.01)

(52) U.S. Cl.
CPC ............. *G06F 8/70* (2013.01); *G06F 21/577* (2013.01); *G06N 5/022* (2013.01); *G06F 2221/033* (2013.01)

(58) Field of Classification Search
CPC .... G06F 8/71; G06F 21/577; G06F 2221/033; G06N 5/022
See application file for complete search history.

(56) References Cited

U.S. PATENT DOCUMENTS

| | | | |
|---|---|---|---|
| 8,412,945 B2 | 4/2013 | Sweet et al. | |
| 8,626,146 B2 | 1/2014 | Koganti et al. | |
| 9,021,458 B1 | 4/2015 | Jacob et al. | |
| 9,086,942 B2 | 7/2015 | Gocek et al. | |
| 9,092,286 B2 | 7/2015 | Sprigg et al. | |
| 9,124,640 B2 | 9/2015 | Sweet et al. | |
| 9,134,989 B2 | 9/2015 | Minear et al. | |
| 9,548,907 B2 | 1/2017 | Finn et al. | |
| 9,742,791 B2 * | 8/2017 | Borohovski | G06F 40/143 |
| 9,762,450 B2 | 9/2017 | Xie et al. | |
| 9,766,873 B2 | 9/2017 | Steigleder | |
| 9,922,055 B2 | 3/2018 | Whitlock et al. | |
| 10,007,501 B1 * | 6/2018 | Zhang | H04L 67/34 |

(Continued)

*Primary Examiner* — Douglas M Slachta
(74) *Attorney, Agent, or Firm* — Moore & Van Allen PLLC; Anup Shrinivasan Iyer

(57) ABSTRACT

Systems, computer program products, and methods are described herein for component-level detection in third party software applications. An example system may receive, from a client device, data packets with payload containing a request to onboard a first application into a computing environment. In response, the system may determine, using an application ingestion subsystem, information associated with the first application, and subsequently deploy, using a machine learning subsystem, a trained machine learning model on the information to various components associated with the first application and component scanning parameters for each of the one or more components. Based on components, the system may build a software bill of materials (SBOM) for the first application.

17 Claims, 5 Drawing Sheets

(56) References Cited

U.S. PATENT DOCUMENTS

| | | | |
|---|---|---|---|
| 10,091,206 B2 | 10/2018 | Jones-McFadden et al. | |
| 10,095,497 B2 | 10/2018 | Jones-McFadden et al. | |
| 10,146,569 B2 | 12/2018 | Hanusiak et al. | |
| 10,175,968 B2 | 1/2019 | Kania et al. | |
| 10,282,426 B1 | 5/2019 | Lerner et al. | |
| 10,382,486 B2 | 8/2019 | Rivers | |
| 10,389,850 B2* | 8/2019 | Fawcett | H04L 41/082 |
| 10,454,963 B1 | 10/2019 | Smith | |
| 10,459,695 B2* | 10/2019 | Hauser | G06F 11/362 |
| 10,635,437 B1* | 4/2020 | Kunjuramanpillai | G06F 8/75 |
| 10,841,839 B2 | 11/2020 | Raleigh et al. | |
| 10,861,600 B2 | 12/2020 | Warner et al. | |
| 11,163,554 B2* | 11/2021 | Niininen | G06N 20/00 |
| 11,210,070 B2* | 12/2021 | Velammal | G06F 8/36 |
| 11,567,753 B1* | 1/2023 | Gao | G06N 5/025 |
| 2014/0359606 A1* | 12/2014 | Salameh | G06F 8/61  717/178 |
| 2017/0169229 A1* | 6/2017 | Brucker | G06F 21/566 |
| 2017/0357494 A1 | 12/2017 | Owin et al. | |
| 2019/0235852 A1* | 8/2019 | Bartolotta | G06F 8/65 |
| 2020/0257515 A1* | 8/2020 | Totale | H04L 67/34 |
| 2020/0409691 A1* | 12/2020 | Mukhopadhyay | G06F 8/65 |
| 2021/0240460 A1* | 8/2021 | Hahn | H04L 67/306 |
| 2022/0269743 A1* | 8/2022 | Balasubramanian | G06F 16/9538 |

* cited by examiner

SYSTEM FOR ENHANCED COMPONENT-LEVEL DETECTION IN SOFTWARE APPLICATIONS WITHIN A COMPUTING ENVIRONMENT

FIELD OF THE INVENTION

The present invention embraces a system for enhanced component-level detection in software applications.

BACKGROUND

In larger entities, many third party software applications are employed in the computing environment to process information on a daily basis. Each application is used to execute specific action. Most entities have a record of the type of applications being used within the computing environment. However, entities may not know information at a level of granularity that will allow for identification of specific libraries that are depended upon by the applications to execute actions.

Therefore, there is a need for a system for enhanced component-level detection in software applications within a computing environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for enhanced component-level detection in software applications is presented. The system comprising: at least one non-transitory storage device; and at least one processor coupled to the at least one non-transitory storage device, wherein the at least one processor is configured to: receive, from a client device, one or more data packets with payload containing a request to onboard a first application into a computing environment; determine, using an application ingestion subsystem, information associated with the first application; deploy, using a machine learning subsystem, a trained machine learning model on the information associated with the first application; determine, using the trained machine learning model, one or more components associated with the first application and one or more component scanning parameters for each of the one or more components; and build a software bill of materials (SBOM) for the first application based on at least the one or more components.

In some embodiments, the at least one processor is further configured to: dynamically generate, using the application ingestion subsystem, scanning instructions for the first application using the one or more component scanning parameters; execute the scanning instructions on the first application; determine one or more elements associated with each of the one or more components based on at least executing the scanning instructions; and build the SBOM for the first application using the one or more elements associated with each of the one or more components.

In some embodiments, the one or more elements comprises at least package managers, manifest files, source code, binary files, containers, packages, artifacts, and/or software libraries.

In some embodiments, the at least one processor is further configured to: initiate, using the application ingestion subsystem, a vulnerability scanning engine on the SBOM for the first application; and determine, using the vulnerability scanning engine, one or more software vulnerabilities associated with the one or more elements associated with each of the one or more components of the first application.

In some embodiments, the at least one processor is further configured to: retrieve, from a first repository, one or more mitigation actions for the one or more software vulnerabilities; and automatically execute, using the application ingestion subsystem, the one or more mitigation actions.

In some embodiments, the at least one processor is further configured to: ingest, using the machine learning subsystem, information associated with the one or more applications, one or more components associated with the one or more applications, and one or more known component scanning parameters; generate a training dataset using the information associated with the one or more applications, the one or more components associated with the one or more applications and the one or more known component scanning parameters; and train, using the machine learning subsystem, a machine learning model using the training dataset.

In some embodiments, the information associated with the one or more applications comprises at least an application type.

In another aspect, a computer program product for enhanced component-level detection in software applications is presented. The computer program product comprising a non-transitory computer-readable medium comprising code causing a first apparatus to: receive, from a client device, one or more data packets with payload containing a request to onboard a first application into a computing environment; determine, using an application ingestion subsystem, information associated with the first application; deploy, using a machine learning subsystem, a trained machine learning model on the information associated with the first application; determine, using the trained machine learning model, one or more component scanning parameters for the first application; dynamically generate, using the application ingestion subsystem, scanning instructions for the first application using the one or more component scanning parameters; execute the scanning instructions on the first application; and build a software bill of materials (SBOM) for the first application based on at least executing the scanning instructions, wherein the SBOM comprises one or more application components.

In yet another aspect, a method for enhanced component-level detection in software applications is presented. The method comprising: receiving, from a client device, one or more data packets with payload containing a request to onboard a first application into a computing environment; determining, using an application ingestion subsystem, information associated with the first application; deploying, using a machine learning subsystem, a trained machine learning model on the information associated with the first application; determining, using the trained machine learning model, one or more components associated with the first application and one or more component scanning parameters for each of the one or more components; and building a software bill of materials (SBOM) for the first application based on at least the one or more components.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
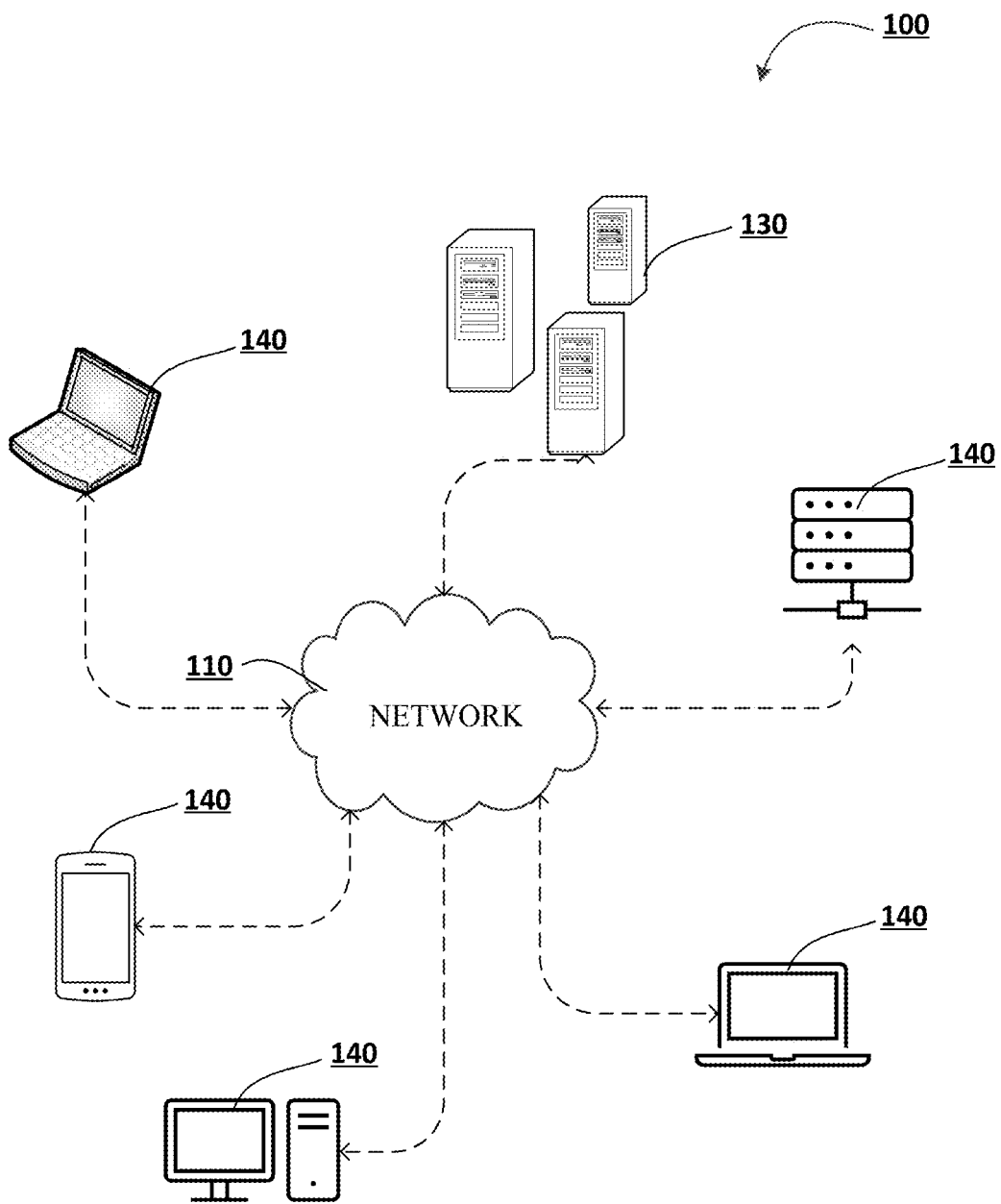
Figure 1B:
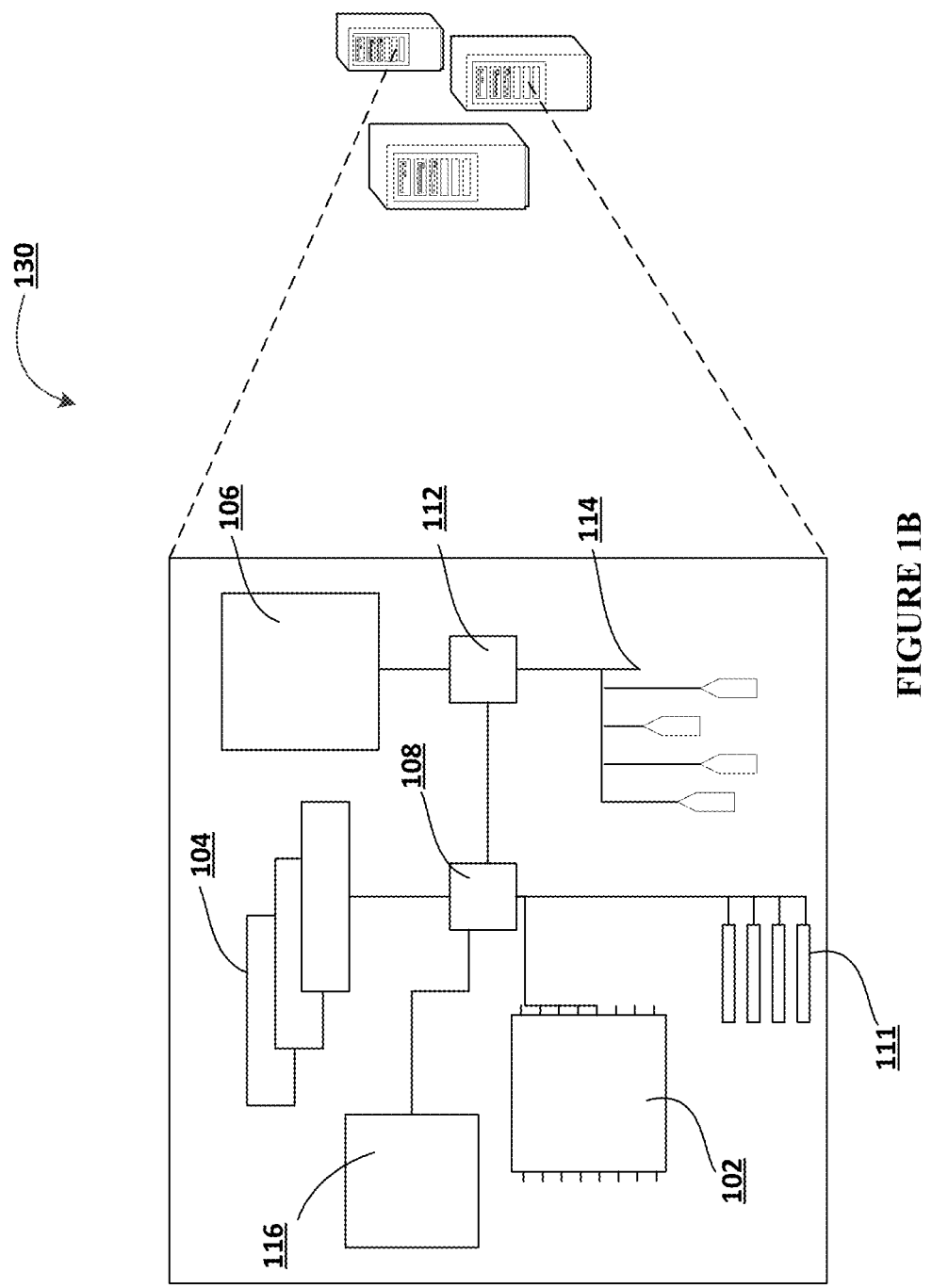
Figure 1C:
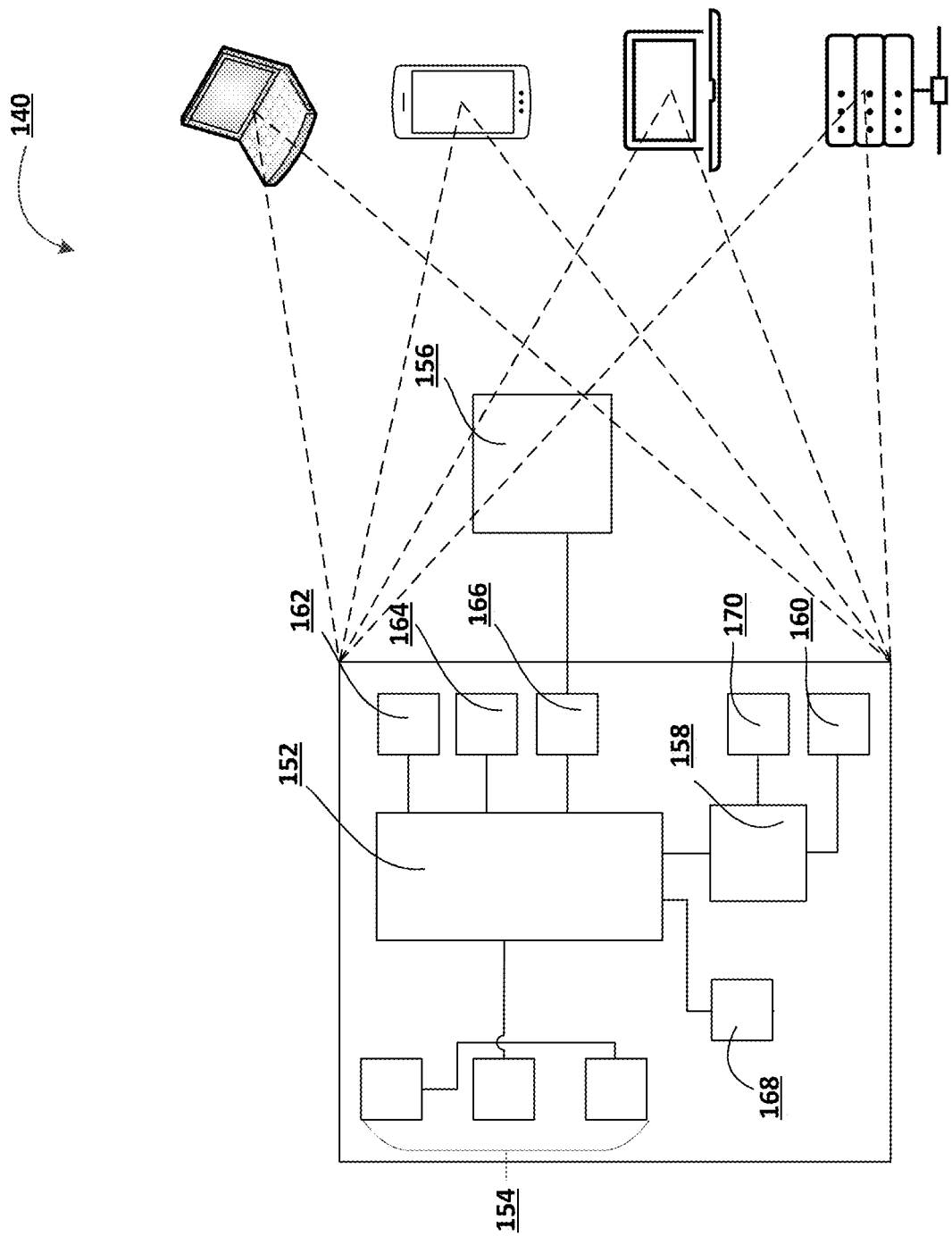
Figure 2:
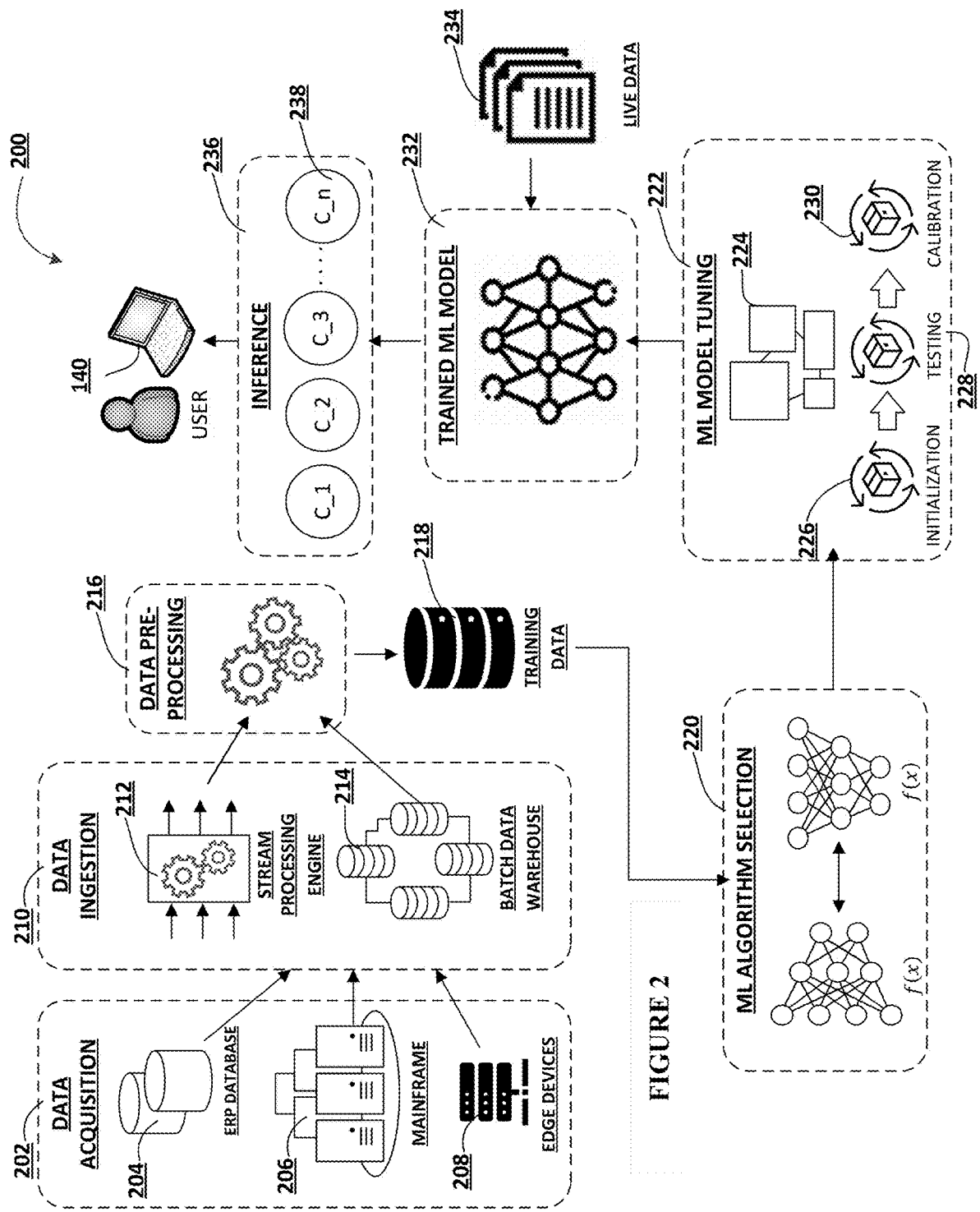
Figure 3:
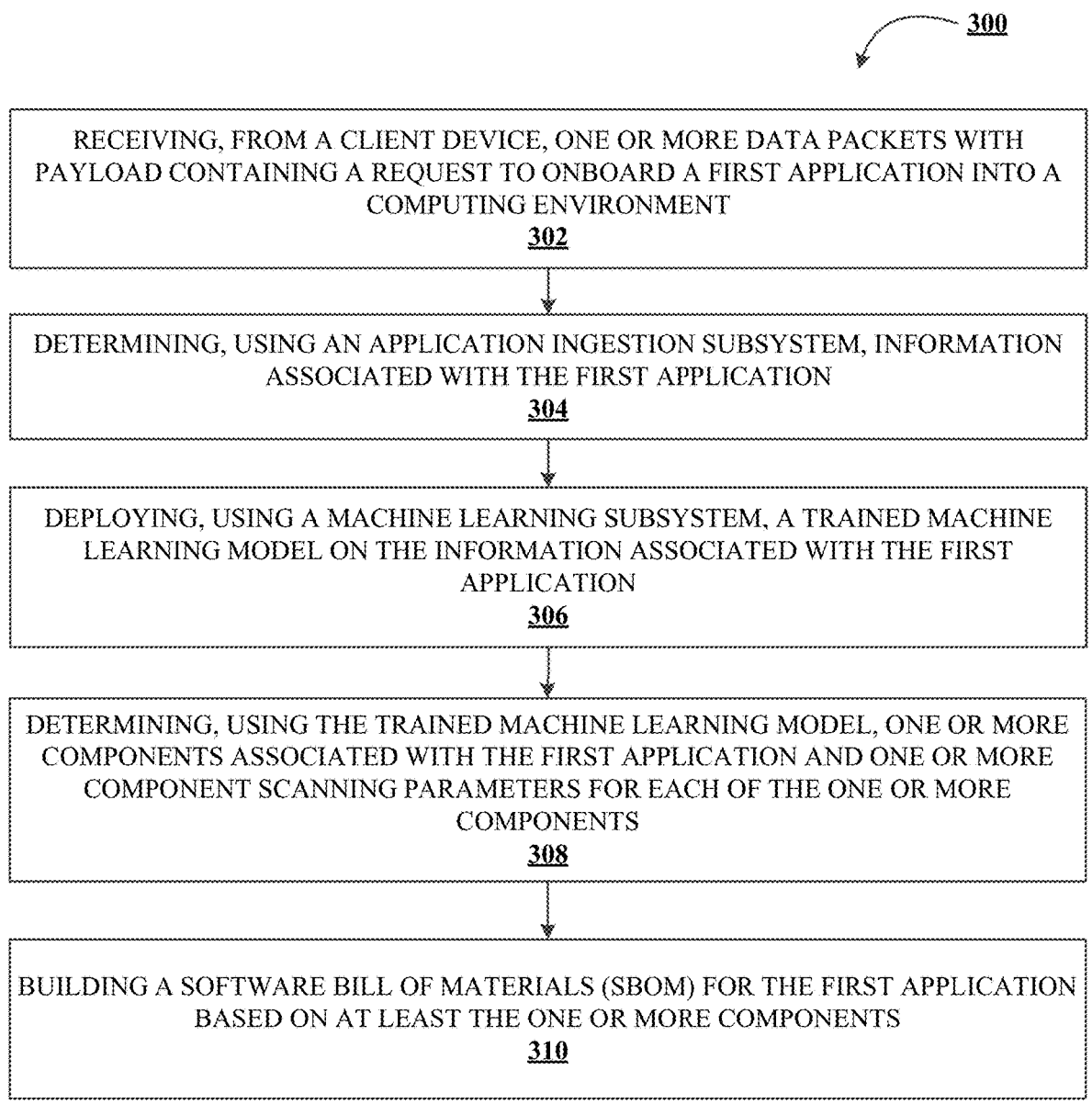

Having thus described embodiments of the invention in general terms, reference will now be made the accompanying drawings, wherein:

FIGS. 1A-1C illustrate technical components of an exemplary distributed computing environment for enhanced component-level detection in software applications, in accordance with an embodiment of the invention;

FIG. 2 illustrates an exemplary machine learning (ML) subsystem architecture, in accordance with an embodiment of the invention; and FIG. 3 illustrates a process flow for enhanced component-level detection in software applications, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships, or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In larger entities, many third party software applications are employed in the computing environment to process information on a daily basis. Each application is used to execute specific action. Most entities have a record of the type of applications being used within the computing environment. When a new application is introduced into the computing environment, i.e., a new application is to be onboarded, most entities require a complete list of all software components of the application, including any third-party open source libraries, vendor provided packages, and first-party artifacts. This information is compiled and presented in the form of a software bill of materials (SBOM). Without the SBOM, there is minimal visibility into any licensing and exposure scenarios associated with the application being onboarded. Maintaining an up-to-date SBOM format compliant software bill of materials is crucial to also keep up with rapid software development, in which components and their versions are swiftly changing. However, SBOMs often do not provide information at a level of granularity that will allow for identification of specific libraries that are depended upon by the applications to execute actions. Even though entities often employ security tools to monitor the computing environment for vulnerabilities, without fully knowing what to test for, security scanning tools often fail to identify software vulnerabilities in some of these components. To solve for this problem, there is a need to first generate an accurate SBOM for an application during onboarding followed by an automated vulnerability scanning engine capable of identifying vulnerabilities in the components identified in the SBOM.

Accordingly, the present invention, (i) receives, from a client device, a request to onboard a first application into a computing environment, (ii) determines, using an application ingestion subsystem, information associated with the first application, (iii) deploys, using a machine learning subsystem, a trained machine learning model on the information associated with the first application. To train the machine learning model, the machine learning subsystem uses information associated with the previously ingested applications, application components associated with the previously ingested applications, and known component scanning parameters for each component. Each component may be a self-contained unit of functionality. Component scanning parameters include controls capable of identifying elements each component. Elements may refer to structural configurations of each component, such as package managers, manifest files, source code, binary files, containers, packages, artifacts, and/or software libraries, (iv) determines, using the trained machine learning model, components of the first application and component scanning parameters for each identified component, (v) dynamically generates, using the application ingestion subsystem, scanning instructions for the first application using the component scanning parameters to identify various elements associated with each component, (vi) builds the SBOM for the first application using the identified elements, (vii) initiates a vulnerability scanning engine on the SBOM to scan each element for known security vulnerabilities, (viii) automatically executes remedial/mitigation actions if and when applicable.

FIGS. 1A-1C illustrate technical components of an exemplary distributed computing environment for enhanced component-level detection in software applications 100, in accordance with an embodiment of the invention. As shown in FIG. 1A, the distributed computing environment 100 contemplated herein may include a system 130, a client(s) 140, and a network 110 over which the system 130 and client(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the client(s) 140 may have a client-server relationship in which the client(s) 140 are remote devices that request and receive service from a centralized server, i.e., the system 130. In some other embodiments, the system 130 and the client(s) 140 may have a peer-to-peer relationship in which the system 140 and the client(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The client(s) 140 may represent various forms of electronic devices, including user input devices such as personal digital assistants, cellular telephones, smartphones, laptops, desktops, and other similar computing devices.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client 140, in accordance with an embodiment of the invention. As shown in FIG. 1C, the client(s) 140 includes a processor 152, memory 154, an input/output device such as a display 156, a communication interface 158, and a transceiver 160, among other components. The client(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the client(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client(s) 140, such as control of user interfaces, applications run by client(s) 140, and wireless communication by client(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of client(s) 140 with other devices. External interface 168 may provide, for example, for wired communication in some implementations, or for wireless communication in other implementations, and multiple interfaces may also be used.

The memory 154 stores information within the client(s) 140. The memory 154 can be implemented as one or more of a computer-readable medium or media, a volatile memory unit or units, or a non-volatile memory unit or units. Expansion memory may also be provided and connected to client(s) 140 through an expansion interface (not shown), which may include, for example, a SIMM (Single In Line Memory Module) card interface. Such expansion memory may provide extra storage space for client(s) 140 or may also store applications or other information therein. In some embodiments, expansion memory may include instructions to carry out or supplement the processes described above and may include secure information also. For example, expansion memory may be provided as a security module for client(s) 140 and may be programmed with instructions that permit secure use of client(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the client(s) 140 to transmit and/or receive information or commands to and from the system 130 via the network 110. Any communication between the system 130 and the client(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the client(s) 140 (or any other computing devices) may provide the system 130 with permissioned to access the protected resources of the client 130 (or any other computing devices), which may include a GPS device, an image capturing component (e.g., camera), a microphone, a speaker, and/or any of the components described herein.

The client(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to client(s) 140, which may be used as appropriate by applications running thereon, and in some embodiments, one or more applications operating on the system 130.

The client(s) 140 may also communicate audibly using audio codec 162, which may receive spoken information from a user and convert it to usable digital information. Audio codec 162 may likewise generate audible sound for a user, such as through a speaker, e.g., in a handset of client(s) 140. Such sound may include sound from voice telephone calls, may include recorded sound (e.g., voice messages, music files, etc.) and may also include sound generated by one or more applications operating on the client(s) 140, and in some embodiments, one or more applications operating on the system 130.

Various implementations of the distributed computing environment 100, including the system 130 and client(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for enhanced component-level detection in software applications 300, in accordance with an embodiment of the invention. As shown in block 302, the process flow includes receiving, from a client device, one or more data packets with payload containing a request to onboard a first application into a computing environment. In some embodiments, the first application may be designed to assist end-users in accomplishing a variety of tasks, which may be related to productivity, creativity, or communication for specific personal, educational, and/or business function. Examples of such an application may include an enterprise resource planning application, customer relationship management application, database applications, project management software application, business process management applications, and/or the like.

Next, as shown in block 304, the process flow includes determining, using an application ingestion subsystem, information associated with the first application. In some embodiments, the information associated with the first application may include at least an application type. Depending on its use and association with a specific domain, each application may be categorized into different types. Accordingly, the application type may include a packaged software, custom software, shareware, freeware, public domain software and/or the like. In some embodiments, each application type may be further categorized based on the specific functions, such as, word processors, graphics software, database software, spreadsheet software, enterprise software, multimedia software, content access software, and/or the like.

Next, as shown in block 306, the process flow includes deploying, using a machine learning subsystem, a trained machine learning model on the information associated with the first application. As described herein, the machine learning model may refer to a mathematical model generated by machine learning algorithms based on training data, to make predictions or decisions without being explicitly programmed to do so. To this end, the machine learning subsystem may be configured to ingest information associated with the one or more applications, one or more components associated with the one or more applications, and one or more known component scanning parameters. In response, the machine learning subsystem may be configured to generate a training dataset using the information associated with the one or more applications, the one or more components associated with the one or more applications and the one or more known component scanning parameters.

In some embodiments, each component may be a self-contained unit of functionality, that may be defined as a modular, deployable, and replaceable part of the application that encapsulates its behavior and data and exposes these through a set of interfaces. As such, each component of an application may be configured to perform one or more application functions. The known component scanning parameters may include one or more controls capable of identifying one or more elements associated with each of the one or mor components. In some embodiments, the one or more elements may refer to structural configurations of each component, such as package managers, manifest files, source code, binary files, containers, packages, artifacts, and/or software libraries.

By training the machine learning model with various applications with known components and corresponding known component scanning parameters, the machine learning subsystem may be configured to build a trained machine learning model that is capable of not only identifying the components in previously unseen applications, but also determining component scanning parameters, i.e., controls that are capable of identifying various elements of each component, including various software libraries or any suite of code that is used to make up the component.

Next, as shown in block 308, the process flow includes determining, using the trained machine learning model, one or more components associated with the first application and one or more component scanning parameters for each of the one or more components. In some embodiments, the system may be configured to dynamically generate, using the application ingestion subsystem, scanning instructions for the first application using the one or more component scanning parameters. In response, the system may be configured to execute the scanning instructions on the first application. By executing the scanning instructions, the system may be configured to determine one or more elements associated with each of the one or more components.

Next, as shown in block 310, the process flow includes building a software bill of materials (SBOM) for the first application based on at least the one or more components. In some embodiments, the system may be configured to build the SBOM for the first application using the one or more elements associated with each of the one or more components.

In some embodiments, the system may be configured to initiate, using the application ingestion subsystem, a vulnerability scanning engine on the SBOM for the first application. In one aspect, the vulnerability scanning engine may be used to scan each element of each component of the first application for known security vulnerabilities. In other words, the vulnerability scanning engine may look for versions that have known bugs. Depending on the access of the vulnerability scanning engine, it may also potentially find configuration errors, such as improper file sharing and similar issues. In another aspect, the vulnerability scanning engine may also scan the network on which the first application sits in an attempt to detect vulnerabilities that are capable of being misused by network-based intrusions. In yet another aspect, the vulnerability scanning engine may also look for changes in systems and critical system files in each element, that may indicate an application compromise. Accordingly, the system may be configured to determine, using the vulnerability scanning engine, one or more software vulnerabilities associated with the one or more elements associated with each of the one or more components of the first application.

In some embodiments, each software vulnerability may be associated with either a remedial or mitigation action. Based on the vulnerability identified, the system may be configured to retrieve, from a first repository, one or more remedial/mitigation actions for vulnerability. In response, the system may be configured to automatically execute, using the application ingestion subsystem, the one or more remedial/mitigation actions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for enhanced component-level detection in software applications, the system comprising:
    at least one non-transitory storage device; and
    at least one processor coupled to the at least one non-transitory storage device, wherein the at least one processor is configured to:
    receive, from a client device, one or more data packets with payload containing a request to onboard a first application into a computing environment;
    determine, using an application ingestion subsystem, information associated with the first application;
    train, using a machine learning subsystem, a machine learning model using known information associated with one or more applications, one or more known components associated with the one or more applications, and one or more known component scanning parameters;
    deploy, using the machine learning subsystem, the trained machine learning model on the information associated with the first application;
    determine, using the trained machine learning model, one or more components associated with the first application and one or more component scanning parameters for each of the one or more components;
    determine one or more elements associated with each of the one or more components;
    build a software bill of materials (SBOM) for the first application based on at least the one or more elements associated with each of the one or more components;
    determine, using a vulnerability scanning engine, one or more software vulnerabilities associated with the one or more elements associated with each of the one or more components of the first application, wherein the one or more software vulnerability issues comprises at least changes in systems and critical system files in each element indicating an application compromise;
    retrieve, from a first repository, one or more mitigation actions for the one or more software vulnerabilities; and
    automatically execute, using the application ingestion subsystem, the one or more mitigation actions.

2. The system of claim 1, wherein the at least one processor is further configured to:
    dynamically generate, using the application ingestion subsystem, scanning instructions for the first application using the one or more component scanning parameters;
    execute the scanning instructions on the first application; and
    determine the one or more elements associated with each of the one or more components based on at least executing the scanning instructions.

3. The system of claim 2, wherein the one or more elements comprises at least package managers, manifest files, source code, binary files, containers, packages, artifacts, and/or software libraries.

4. The system of claim 1, wherein the at least one processor is further configured to:
    initiate, using the application ingestion subsystem, the vulnerability scanning engine on the SBOM for the first application.

5. The system of claim 1, wherein the at least one processor is further configured to:
    ingest, using the machine learning subsystem, the known information associated with the one or more applications, the one or more known components associated with the one or more applications, and the one or more known component scanning parameters.

6. The system of claim 5, wherein the known information associated with the one or more applications comprises at least an application type.

7. A computer program product for enhanced component-level detection in software applications, the computer program product comprising a non-transitory computer-readable medium containing code causing a first apparatus to:
    receive, from a client device, one or more data packets with payload containing a request to onboard a first application into a computing environment;
    determine, using an application ingestion subsystem, information associated with the first application;
    train, using a machine learning subsystem, a machine learning model using known information associated with one or more applications, one or more known components associated with the one or more applications, and one or more known component scanning parameters;
    deploy, using the machine learning subsystem, the trained machine learning model on the information associated with the first application;
    determine, using the trained machine learning model, one or more components associated with the first application and one or more component scanning parameters for each of the one or more components;
    determine one or more elements associated with each of the one or more components;
    build a software bill of materials (SBOM) for the first application based on at least the one or more elements associated with each of the one or more components;
    determine, using a vulnerability scanning engine, one or more software vulnerabilities associated with the one or more elements associated with each of the one or more components of the first application, wherein the one or more software vulnerability issues comprises at least changes in systems and critical system files in each element indicating an application compromise;
    retrieve, from a first repository, one or more mitigation actions for the one or more software vulnerabilities; and
    automatically execute, using the application ingestion subsystem, the one or more mitigation actions.

8. The computer program product of claim 7, wherein the first apparatus is further configured to:
    dynamically generate, using the application ingestion subsystem, scanning instructions for the first application using the one or more component scanning parameters;
    execute the scanning instructions on the first application; and
    determine the one or more elements associated with each of the one or more components based on at least executing the scanning instructions.

9. The computer program product of claim 8, wherein the one or more elements comprises at least package managers, manifest files, source code, binary files, containers, packages, artifacts, and/or software libraries.

10. The computer program product of claim 7, wherein the first apparatus is further configured to:
    initiate, using the application ingestion subsystem, the vulnerability scanning engine on the SBOM for the first application.

11. The computer program product of claim 7, wherein the first apparatus is further configured to:

ingest, using the machine learning subsystem, the known information associated with the one or more applications, the one or more known components associated with the one or more applications, and the one or more known component scanning parameters.

12. The computer program product of claim 11, wherein the known information associated with the one or more applications comprises at least an application type.

13. A method for enhanced component-level detection in software applications, the method comprising:

receiving, from a client device, one or more data packets with payload containing a request to onboard a first application into a computing environment;

determining, using an application ingestion subsystem, information associated with the first application;

training, using a machine learning subsystem, a machine learning model using known information associated with one or more applications, one or more known components associated with the one or more applications, and one or more known component scanning parameters;

deploying, using the machine learning subsystem, the trained machine learning model on the information associated with the first application;

determining, using the trained machine learning model, one or more components associated with the first application and one or more component scanning parameters for each of the one or more components;

determining one or more elements associated with each of the one or more components;

building a software bill of materials (SBOM) for the first application based on at least the one or more elements associated with each of the one or more components;

determining, using a vulnerability scanning engine, one or more software vulnerabilities associated with the one or more elements associated with each of the one or more components of the first application, wherein the one or more software vulnerability issues comprises at least changes in systems and critical system files in each element indicating an application compromise;

retrieving, from a first repository, one or more mitigation actions for the one or more software vulnerabilities; and automatically executing, using the application ingestion subsystem, the one or more mitigation actions.

14. The method of claim 13, wherein the method further comprises:

dynamically generating, using the application ingestion subsystem, scanning instructions for the first application using the one or more component scanning parameters;

execute the scanning instructions on the first application; and determining the one or more elements associated with each of the one or more components based on at least executing the scanning instructions.

15. The method of claim 13, wherein the method further comprises:

initiating, using the application ingestion subsystem, the vulnerability scanning engine on the SBOM for the first application.

16. The method of claim 13, wherein the method further comprises:

ingesting, using the machine learning subsystem, the known information associated with the one or more applications, the one or more known components associated with the one or more applications, and the one or more known component scanning parameters.

17. The method of claim 16, wherein the known information associated with the one or more applications comprises at least an application type.

\* \* \* \* \*